3,704,104
PROCESS FOR THE PRODUCTION OF TRICHLOROSILANE

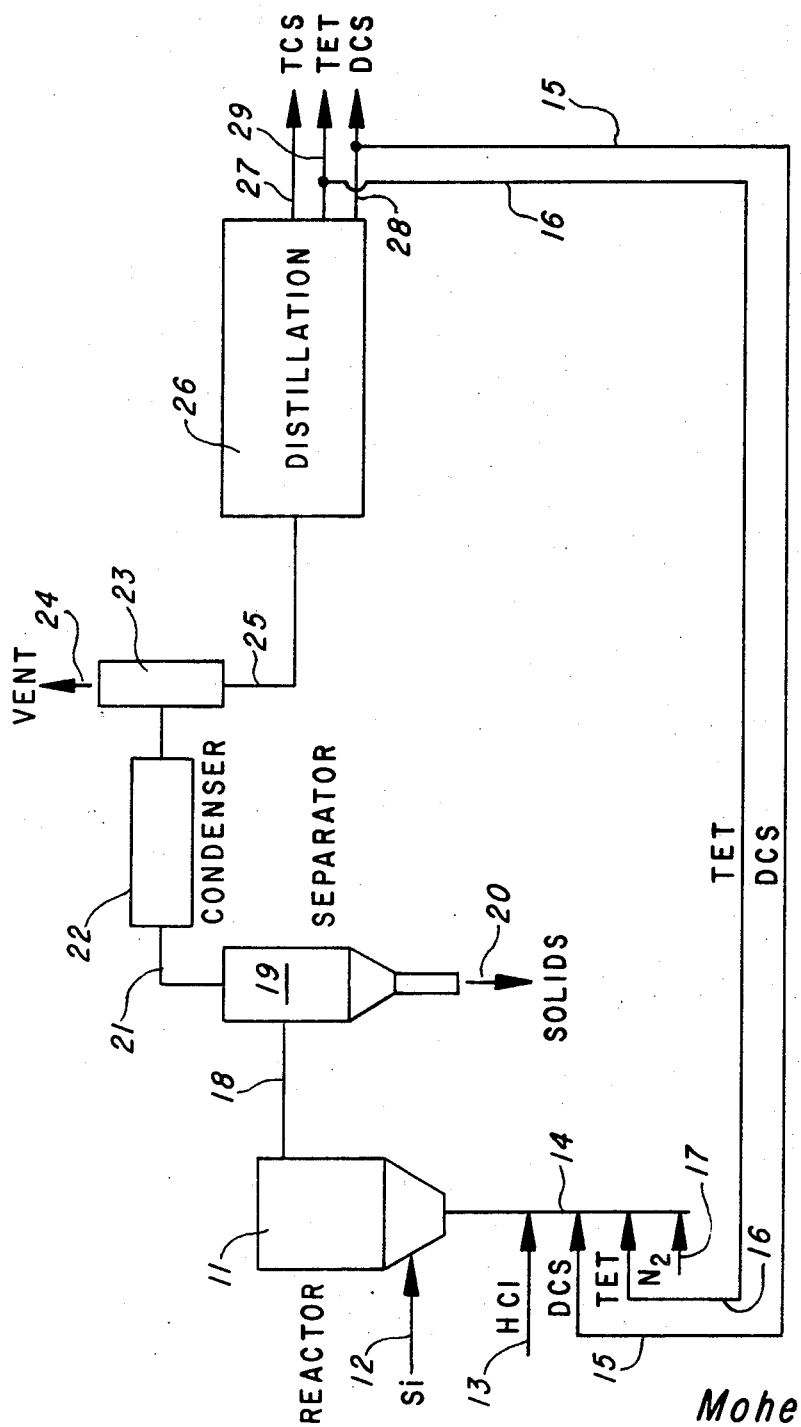

Mohendra S. Bawa and Donald O. Thur, Richardson, Tex., assignors to Texas Instruments Incorporated, Dallas, Tex.
Filed June 1, 1970, Ser. No. 42,356
Int. Cl. C01b 33/04
U.S. Cl. 423—342
6 Claims

ABSTRACT OF THE DISCLOSURE

In the production of trichlorosilane (TCS) from the reaction of elemental silicon with hydrogen chloride, substantially improved yields are obtained by separating dichlorosilane (DCS) and silicon tetrachloride (TET) from the product mixture and recycling these by-products to the reaction zone. In the preferred embodiment, it is essential to maintain the molar ratio of recycled silicon tetrachloride to recycled dichlorosilane no greater than 1.0. Also, the following conditions are preferably maintained in the reaction zone: (1) a short residence time, (2) a low partial pressure of HCl, and (3) a relatively low temperature.

---

This invention relates to the production of trichlorosilane, and more particularly to methods for improving the yield of trichlorosilane obtained from the reaction of elemental silicon with hydrogen chloride, by recycling silicon tetrachloride and/or dichlorosilane to the reaction zone.

Trichlorosilane is produced commercially by the reaction of hydrogen chloride with a fluidized bed of particulate elemental silicon. An example of this process is found in U.S. Pat. 3,148,035. The effluent product stream obtained from the reactor contains dichlorosilane and silicon tetrachloride, in addition to trichlorosilane, as will be apparent from the following simplified equations:

$$Si + 2HCl \rightleftharpoons SiH_2Cl_2$$
$$Si + 3HCl \rightleftharpoons SiHCl_3 + H_2$$
$$Si + 4HCl \rightleftharpoons SiCl_4 + 2H_2$$

For various economic reasons the trichlorosilane is frequently the only product desired from the reaction. Accordingly, it is a primary object of the present invention to maximize the yield of trichlorosilane and to minimize the production of both dichlorosilane and silicon tetrachloride.

A primary feature of the invention involves the steps of separating silicon tetrachloride or dichlorosilane, or both, from the reaction effluent mixture and recycling these by-products to the reaction zone. In a preferred embodiment the molar ratio of silicon tetrachloride to dichlorosilane in the recycled stream is maintained no greater than 1.0. The uncontrolled recycle of all tetrachloride and dichlorosilane would involve ratios substantially higher than 1.0 and would require operating conditions such as to form dichlorosilane in sufficient amounts to adjust the silicon tetrachloride to dichlorosilane ratio at 1.0.

As an additional feature of the invention, the reaction conditions are carefully controlled to maintain a temperature within the range of 600° to 650° F., preferably between 620° and 640° F., and a residence time of less than 30 seconds, preferably 5 to 20 seconds. Dilution of HCl by an inert gas such as nitrogen is also known to favor formation of trichlorosilane.

Additional objects and features of the invention will be apparent from the following description of the drawing. The drawing:

Reactor 11 is supplied with elemental silicon by means of line 12. The silicon is supplied in particulate form having a grain diameter of 0.1 to 0.36 mm. The HCl is supplied through lines 13 and 14, together with the recycled dichlorosilane and silicon tetrachloride through lines 15 and 16, respectively. All the reactants are supplied in vaporous form under sufficient pressure and velocity to fluidize the body of particulate silicon in reactor 11. The reactants may be diluted with nitrogen supplied through line 17 in order to provide independent control over the vapor pressure of the individual constituents while maintaining the necessary flow rate to ensure fluidization.

The reactor effluent is removed through line 18 and passed to fines filter 19 for the removal of entrained solids through line 20. The vaporous effluent is passed through line 21 and condensor 22 into separator 23 for the removal of gases through line 24. Condensed liquids are removed through line 25 and passed into a distillation zone 26 which consists of conventional distillation equipment suitable for the separation of dichlorosilane and silicon tetrachloride from the trichlorosilane removed through line 27. Generally, it will be suitable to recycle all the dichlorosilane produced in the process and removed through line 28. A substantially greater amount of silicon tetrachloride is usually produced, which means that only a fraction thereof is recycled in accordance with the preferred embodiment of the invention.

As an example of plant operation in accordance with the invention, HCl is passed through line 13 at a rate of about 30 lbs. per hour and combined with 1 lb. per hour of dichlorosilane recycled through line 15 and .3 lb. per hour of silicon tetrachloride recycled through line 16. The combined stream passing through line 14 is introduced into reactor 11 where it contacts an excess of silicon at a temperature of about 630° F. After a residence time of about 20 seconds the total effluent is removed through line 18 followed by separation of solids through line 20 and the removal of gases through line 24. The liquid products passed through line 25 are separated by distillation to produce trichlorosilane at the rate of about 28 lbs. per hour. Four lbs. per hour of silicon tetrachloride are removed through line 29 in addition to the amount recycled, while the entire volume of dichlorosilane is recycled through line 15.

Extended plant operation without recycle has shown the following equation to be representative of the product ratios obtained:

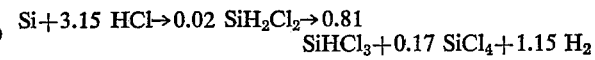

$$Si + 3.15\ HCl \rightarrow 0.02\ SiH_2Cl_2 \rightarrow 0.81$$
$$SiHCl_3 + 0.17\ SiCl_4 + 1.15\ H_2$$

In the preferred operation, by recycling all DCS plus limited amounts of TET, the results are represented by the following equation:

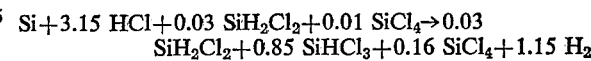

$$Si + 3.15\ HCl + 0.03\ SiH_2Cl_2 + 0.01\ SiCl_4 \rightarrow 0.03$$
$$SiH_2Cl_2 + 0.85\ SiHCl_3 + 0.16\ SiCl_4 + 1.15\ H_2$$

By recycling DCS only, the following results were obtained:

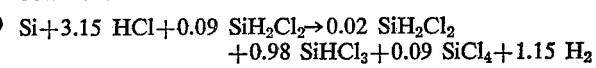

$$Si + 3.15\ HCl + 0.09\ SiH_2Cl_2 \rightarrow 0.02\ SiH_2Cl_2$$
$$+ 0.98\ SiHCl_3 + 0.09\ SiCl_4 + 1.15\ H_2$$

In this operation the major proportion of DCS charged to the reactor was obtained from an extraneous source; however, the increased yield of TCS is apparent, and is obtained to a lesser degree when the recycled DCS is the sole source of DCS charged to the reactor.

In a laboratory system, the following results were obtained to illustrate a recycle of silicon tetrachloride only:

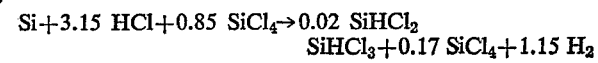

$$Si + 3.15\ HCl + 0.85\ SiCl_4 \rightarrow 0.02\ SiHCl_2$$
$$SiHCl_3 + 0.17\ SiCl_4 + 1.15\ H_2$$

Here again, the amount of tetrachloride charged is in excess of any amount normally produced, without recycle. However, since the amount of SiCl$_4$ on both sides of the above equation is substantially the same, a recycle operation is clearly shown to be feasible.

What is claimed is:

1. In a method for the production of trichlorosilane wherein elemental silicon is reacted by direct contact with hydrogen chloride to yield a mixture of trichlorosilane, dichlorosilane and silicon tetrachloride, the improvement comprising the steps of:
   (a) separating silicon tetrachloride and dichlorosilane from said mixture;
   (b) recycling said dichlorosilane and silicon tetrachloride to the reaction zone; and
   (c) maintaining the molar ratio of recycled tetrachloride to recycled dichlorosilane no greater than 1.0.

2. The method of claim 1 wherein said ratio is maintained no greater than 0.5.

3. The method of claim 1 wherein the reaction temperature is maintained between 620° and 640° F.

4. The method of claim 1 wherein the residence time of the vapor phase reactants in the reaction zone is from 5 to 20 seconds.

5. In a method for the production of trichlorosilane wherein elemental silicon is reacted by direct contact with hydrogen chloride to yield a mixture of trichlorosilane, dichlorosilane and silicon tetrachloride, and wherein trichlorosilane is separated from the reaction effluent, the improvement comprising the steps of separating dichlorosilane from said mixture as the only recycle stream, and recycling at least a portion thereof to the reaction zone, while maintaining a temperature of 600°–650° F. in the reaction zone, and a residence time of less than 30 seconds.

6. In a method for the production of trichlorosilane wherein elemental silicon is reacted by direct contact with hydrogen chloride to yield a mixture of trichlorosilane, dichlorosilane and silicon tetrachloride, and wherein trichlorosilane is separated from the reaction effluent, the improvement comprising the steps of separating silicon tetrachloride from said mixture and recycling at least a portion thereof to the reaction zone, while maintaining a temperature of 600°–650° F. in the reaction zone, and a residence time of less than 30 seconds.

References Cited

UNITED STATES PATENTS

| 2,499,009 | 2/1950 | Wagner | 23—366 |
| 3,148,035 | 9/1964 | Enk et al. | 23—366 X |
| 3,565,590 | 2/1971 | Bracken | 23—366 |

FOREIGN PATENTS

| 652,188 | 11/1962 | Canada | 23—366 |
| 883,326 | 11/1961 | Great Britain. | |
| 504,581 | 7/1954 | Canada | 23—366 |
| 899,553 | 6/1962 | Great Britain | 23—366 |

HERBERT T. CARTER, Primary Examiner